United States Patent [19]

Salton et al.

[11] Patent Number: 4,781,882

[45] Date of Patent: Nov. 1, 1988

[54] GUIDE ROLLER ASSEMBLY FOR NUCLEAR REACTOR REFUELING APPARATUS

[75] Inventors: Robert B. Salton, Plum Boro; Leonard P. Hornak, Forest Hills, both of Pa.

[73] Assignee: Westinghouse Electric Corp., Pittsburgh, Pa.

[21] Appl. No.: 49,494

[22] Filed: May 14, 1987

[51] Int. Cl.[4] .............................................. G21C 19/20
[52] U.S. Cl. ..................................... 376/271; 212/269
[58] Field of Search ............... 376/261, 262, 264, 268, 376/271; 294/906; 414/146, 728; 212/269; 193/30

[56] References Cited

U.S. PATENT DOCUMENTS

| | | | |
|---|---|---|---|
| 3,341,029 | 9/1967 | Barkley et al. | 212/269 |
| 3,421,635 | 1/1969 | Bunger | 376/271 |
| 3,937,513 | 2/1976 | Hoffmeister | 376/268 |
| 3,978,957 | 9/1976 | Hoffmeister | 376/268 |
| 4,045,923 | 9/1977 | Shanmugasundaram | 212/269 |
| 4,311,557 | 1/1982 | Kowalski et al. | 376/271 |
| 4,511,531 | 4/1985 | Swidwa et al. | 376/271 |
| 4,663,114 | 5/1987 | Cransac et al. | 376/271 |

Primary Examiner—Charles T. Jordan
Assistant Examiner—Daniel Wasil
Attorney, Agent, or Firm—M. G. Panian

[57] ABSTRACT

An apparatus for loading and unloading a fuel assembly in a nuclear reactor has a bridge and trolley for positioning the fuel assembly and a pair of concentric inner and outer masts with the inner mast vertically movable in the outer mast and guide means to concentrically position the inner mast within the outer mast during such vertical movement. The guide means comprises inner members on the inner mast which cooperate with outer members on the outer mast, the outer members pivotally mounted on a framework on the outer mast for movement towards or away from the inner members. An alignment device is provided to precisely align superimposed outer members and provide vertical alignment therebetween, with an adjustment device provided to aid in the precise alignment of the same.

14 Claims, 6 Drawing Sheets

GUIDE ROLLER ASSEMBLY FOR NUCLEAR REACTOR REFUELING APPARATUS

The present invention relates to an improved apparatus for refueling of a nuclear reactor. As described in U.S. Pat. No. 4,311,557 to Edward F. Kowalski et al., assigned to the assignee of the present invention, the contents of which are incorporated herein, some fuel assemblies are periodically removed from the reactor core while other assemblies are moved about within the core to new positions and new fuel assemblies introduced into the core to replace those that were removed.

As described in U.S. Pat. No. 4,311,557, a refueling apparatus generally uses a means for positioning the fuel assembly above the reactor and concentrically aligned vertical inner and outer masts which raise or lower the fuel assembly as desired. The inner mast carries the fuel assembly and is vertically axially movable relative to the outer mast in a telescopic manner. In order to centrally position the vertically movable inner mast relative to the surrounding outer mast, guide means or rollers are provided so as to prevent displacement of the centrally positioned inner mast. As claimed in said patent, guiding means are provided which comprises at least one member on the inner mast which cooperates with a complementary shaped member on the outer mast to guide the inner mast vertically when moved from one elevation to another, the member on the inner mast illustrated as having a grooved surface and the member on the outer mast being a rotating element which rolls in the groove during mast movement. One embodiment thereof is illustrated in FIG. 10 of that patent.

Figure 1:
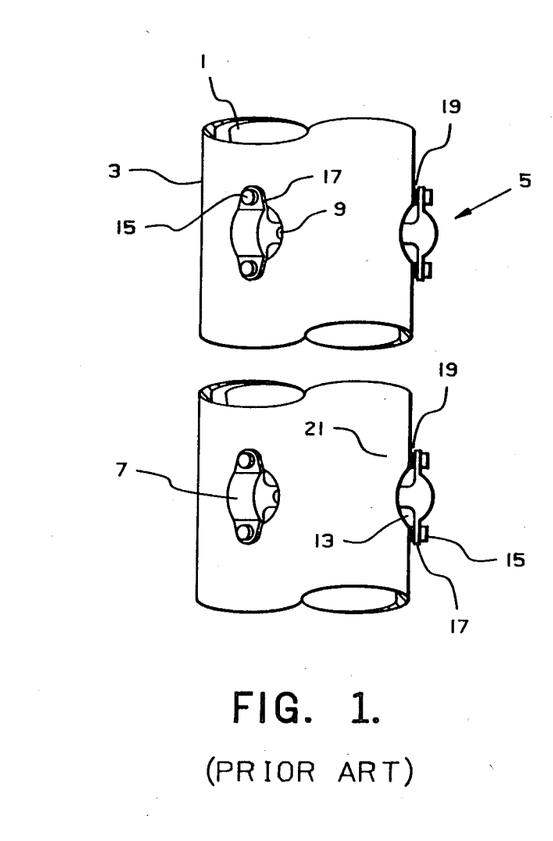
FIG. 1 is a schematic illustration of a prior art guide roller assembly for use with concentric masts of a fuel assembly loading and unloading apparatus using shims.
Figure 2:
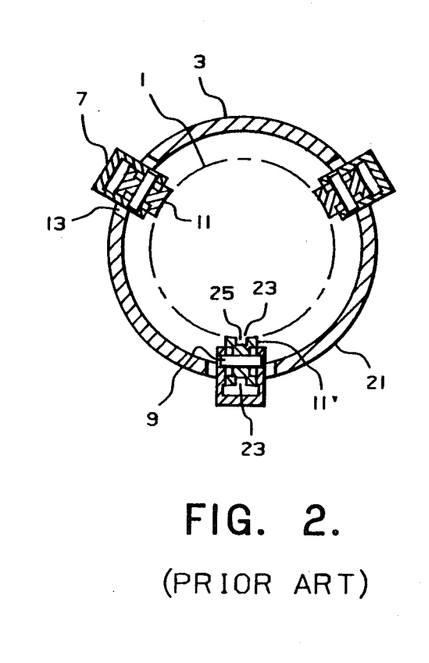
FIG. 2 is a cross-sectional view of the apparatus of FIG. 1.
Figure 3:
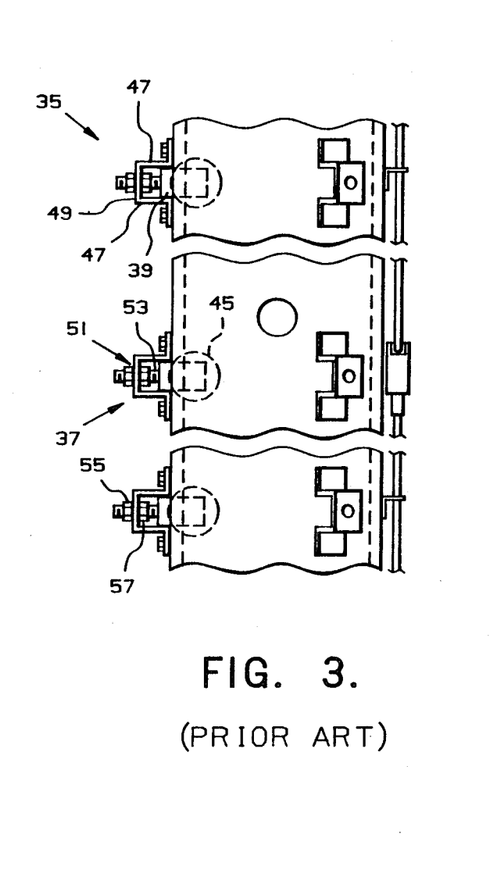
FIG. 3 is a schematic illustration of another prior art guide roller assembly for use with concentric masts of a fuel assembly loading and unloading apparatus using a bracket and lock nuts on a threaded rod.
Figure 4:
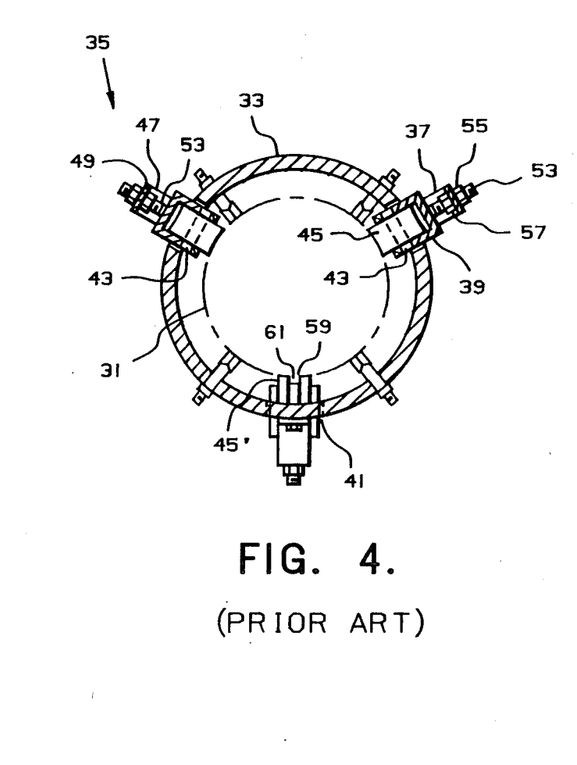
FIG. 4 is a cross-sectional view of the apparatus of FIG. 3.

Generally, about two or three guide roller assemblies are provided in a common plane at about eight spaced vertical locations along the mast, with the outer members mounted on the outside of the outer mast and projecting through openings in the wall of the outer mast. The guide roller assemblies extend through the openings in the outer or stationary mast and alignment thereof made at the manufacturing site. When the masts are readied for use in the refueling machine, further alignment is usually needed. One type of adjustment is effected by the use of shims between a roller housing and the outer mast at the location of the screws that mount the roller housing on the mast. Such an alignment system is illustrated in FIGS. 1 and 2 hereof, where an inner mast 1 is centrally disposed in an outer mast 3, with guide means 5 aligning the same. The guide means, as illustrated, includes a housing 7 that carries a shaft 9 upon which roller 11 is retained, the roller extending inwardly from the outer mast 3 through openings 13 towards the inner mast 1. Screws 15 extend through flanges 17 of the housing 7 and mount the housing 7 to the outer mast 3. Shims 19 are used between the flanges 17 of the housing and the outer surface 21 of the outer housing 3. As illustrated, one of the guide rollers 11' is provided with a groove 23 that cooperates with a projecting member 25 on the inner mast 1 to prevent the rotation of the inner mast 1 relative to the outer mast 3 during vertical movement thereof. In another existing construction of such an alignment system, as illustrated in FIGS. 3 and 4 hereof, an inner mast 31 is concentrically disposed within an outer mast 33, and guide means 35 are used to align the two masts. As illustrated, the guide means 35 include a housing 37 which slidably supports a bracket 39. The bracket extends through an opening 41 in the outer mast 33 and caries a shaft 43 upon which a roller 45 is mounted. The housing has upper and lower walls 47 and a rear wall 49, with the rear wall 49 having an aperture 51 therethrough. Extending through the aperture is a threaded rod 53 that carries the bracket 39 and the threaded rod 53 has thereon a pair of lock nuts 55 and 57 which may be loosened to permit sliding of the bracket 39 and shaft 43 towards or away from the inner mast 31 and then tightened to lock the bracket and roller in a predetermined location relative to the inner mast 31. In this device also, a groove 59 is provided in a roller 45' which cooperates with a projection 61 on the inner mast 31 to prevent rotational movement of the inner mast 31 relative to the outer mast 33.

With either of the above designs of guide means, the inner mast alignment with the outer mast is accomplished in a fabricator's shop with the guide means, or roller assemblies, then marked for location and removed from the outer mast for shipment. Field realignment of the inner mast is very difficult and usually necessary. Due to a combination of misadjustment and wear, the alignment spacing often is enlarged during service. In some cases, the spacing is large enough to allow an orientation feature on the inner mast to come out of engagement with a complementary grooved guide roller permitting the inner mast to freely rotate within the outer mast.

SUMMARY OF THE INVENTION

An apparatus for loading or unloading a fuel assembly in a nuclear reactor has a means for positioning a fuel assembly with a housing carrying a pair of concentric inner and outer masts. The inner mast has means thereon for gripping a fuel assembly and is vertically movable axially relative to the outer mast. A guide means is provided on the inner and outer masts to align the inner mast centrally within the outer mast during relative vertical movement therebetween, the guide means including a plurality of inner members on the inner mast and cooperating outer members on the outer mast, with the outer members supported on the outer mast and pivotally mounted for movement towards and away from the inner members. Alignment means are provided to enable vertical precise alignment of superimposed outer members relative to the inner members.

The outer members are supported on the outer mast, such that the rollers are pivotally movable, by a framework that comprises a top wall and bottom wall and end plate, with side bars attached to a pivot pin passing through a bore in the bottom wall of the framework. A precise adjustment of the rollers is achieved by use of an alignment beam extending between the two side bars adjacent the upper ends thereof and an adjustable device coacting with a sleeve about the alignment beam which includes a threaded sleeve and lock nut with a shoulder of a hollow stud abutting the inner wall of the end plate and the lock nut abutting the outer wall of the end plate.

DETAILED DESCRIPTION

The present invention provides an improved refueling machine for a nuclear reactor and an improved guide means for aligning the inner and outer mast of a refueling machine.

An apparatus 101 for loading or unloading a fuel assembly in a nuclear reactor and improved guide means 103, as illustrated in FIGS. 5 to 8, has a means 105 for positioning a fuel assembly 107 above a nuclear reactor (not shown). The apparatus includes a housing 109 which carries concentric inner mast 111 and outer mast 113, the inner mast having at the lower portion thereof a means 115 for gripping the upper nozzle 117 of a fuel assembly 107, and means for releasing or engaging the fuel assembly.

Figures 5, 6:
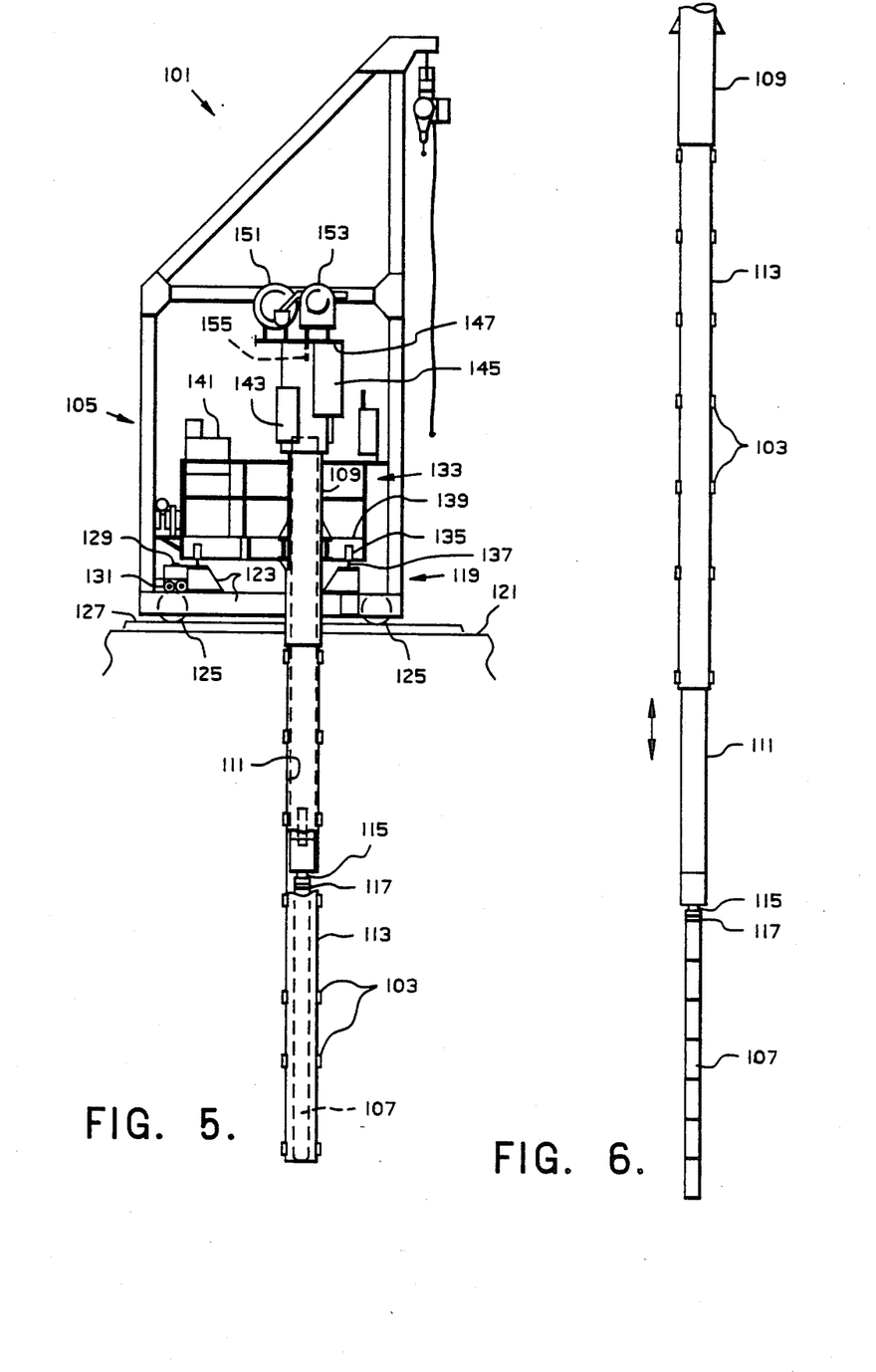
FIG. 5 is a side view of the refueling apparatus of the present invention showing the inner mast and fuel assembly in raised position within the outer mast.
FIG. 6 is a view of the concentric masts of FIG. 5 in elongated position.

The means 105 for positioning a fuel assembly comprises a movable bridge 119 that is mounted on opposite walls 121 of a reactor containment, the bridge 119 having structural members 123 for strength and rigidity. The bridge 119 is adapted to travel horizontally on wheels 125 and rails 127 fixed on the top of containment walls 121. Wheels 125 are driven by a motor 129 and shafts 131. A motor driven trolley 133 is mounted on wheels 135 which run on rails 137 mounted on the bridge 119 for horizontal travel transverse to the travel of the bridge 119, such that the housing 109 and inner and outer masts 111, 113 are positionable over any one of the fuel assemblies in the reactor or a refueling pool to either insert or remove a fuel assembly 107 from the reactor core. A platform 139 is provided on the trolley 133 as well as a control console 141 which contains equipment to control drive motors, hoists and air compressors. The housing 109 for concentric masts 111, 113 is attached to the platform 139 such as by welding, with one end of the housing 109 extending below the platform 139 while the other end projects thereabove. A window 143 may be provided to observe the position of the upper end of the masts, and an electrical control 145 may be welded to the mast housing 109. A stationary plate 147 is mounted on the upper end of housing 109 and has an opening through which hoist, electrical and air lines extend. This opening also serves to permit removal or insertion of the inner mast 111 for maintenance. Cable reels, such as reel 151 enclose reels which support air lines or electrical cables arranged to be played out or taken in as the mast is raised or lowered. Plate 147 also supports hoist 153, which hoist carries hoist cable 155 that supports the inner mast 111 which, in turn, carries the fuel assembly 107.

In operation of the fuel assembly loading or unloading apparatus 101, to remove a fuel assembly 107 from a reactor core, means 105 for positioning the fuel assembly 107 is operated and the bridge 119 and trolley 133 positioned directly above the fuel assembly that is to be removed. The inner mast 111, which is in an upper stored position within outer mast 113, is then lowered and the gripping means 115 engages the upper nozzle 117 of the fuel assembly. The inner mast 111 is reciprocally mounted in the outer mast 113 and movable as indicated by the double arrow in FIG. 6. Upon gripping of the fuel assembly 107, the hoist is engaged to lift the fuel assembly from the reactor core. The hoist 153 raises the inner mast 111 and engaged fuel assembly 107 into the confines of the outer mast 113 to a housed portion. The positioning means, trolley and bridge are then moved to another position and the fuel assembly lowered to a storage chamber and released from the inner mast. Loading of a fuel assembly in a reactor core involves reverse operation of this procedure.

During the coaxial movement of the inner mast 111 relative to the outer mast 113, guide means are provided to maintain a concentric relationship between these two masts. The guide means 103 of the present invention is illustrated in detail in FIGS. 7 to 10 in association with a rectangular-shaped inner mast and circular-shaped outer mast, although the cross-section of the masts could be of another shape. The guide means 103 has a plurality of inner members 161 on the inner mast 111 and a plurality of complementary shaped cooperating outer members 163 on the outer mast 113, with means 165 for supporting the outer members 163 on the outer mast 113 and means 167 for pivoting the outer members 163 relative to the support means 165 towards and away from the inner members 161.

Figure 7:
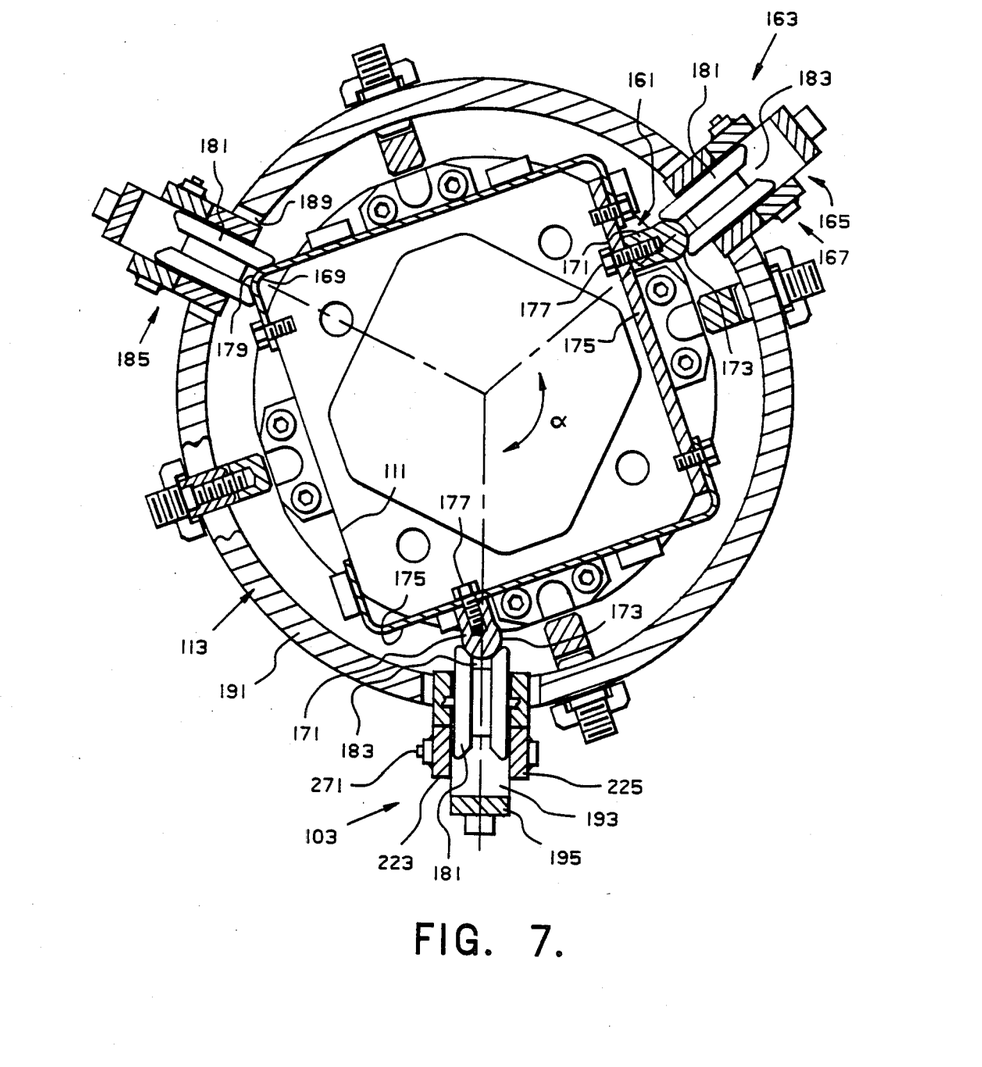
FIG. 7 is a cross-sectional view through the concentric masts illustrating a square-shaped inner mast and the inner and outer guide members on the inner and outer masts.

The inner members 161 are illustrated as a corner 169 of the rectangularly-shaped inner mast 111, and a pair of vertically extending rods 171, having a convex surface or rounded face 173, secured to the wall 175 of the inner mast by means of bolts 177. The convex surface or corner 169, acting as an inner member also has a rounded outer face 179. Preferably three such inner members 161 are provided equally spaced about the inner mast on an angle of about 120 degrees apart to provide a balanced support of the inner mast 111 in the outer mast 113.

The complementary outer members 163 on the outer mast 113 which cooperate with the inner members 161 on the inner mast 111 are illustrated as rollers 181 that are pivotally attached to the means 165 for supporting the same, the rollers 181 having a groove 183 therein in which the rounded faces 173 and 179 will ride. The support means 165 comprises a framework 185 comprised of top wall 187, above an opening 189 in the wall 191 of the outer mast 113 and a bottom wall 193, below the opening 189, with a rear wall, or plate, 195 extending between top and bottom walls 187 and 193. The plate 195 has two spaced apertures, upper and lower apertures, 197, 199, therethrough, through which upper and lower bolts 201, 203 are inserted, the bolts 201, 203 threadedly engaging in threaded bores 205 in the wall 191 of the outer mast 113. The bottom wall 193 is in the form of a block 207 with an aperture 209 therethrough coaxial with lower aperture 199, through which the lower bolt 203 also extends, to provide additional rigidity, while the top wall 187 is of a lesser thickness than the block 207 and may have a concave groove 211 in the lower face 213 thereof in which upper bolt 201 will seat.

Figure 8:
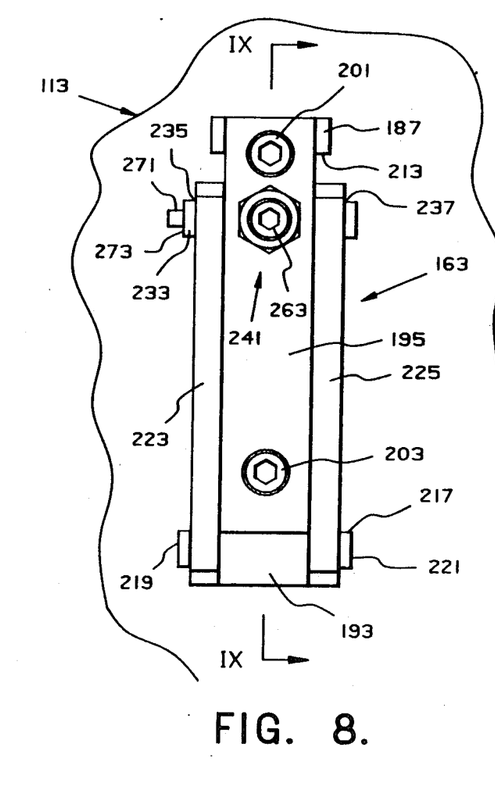
FIG. 8 is an end view of a support means for an outer member and the pivoting means associated therewith.
Figure 9:
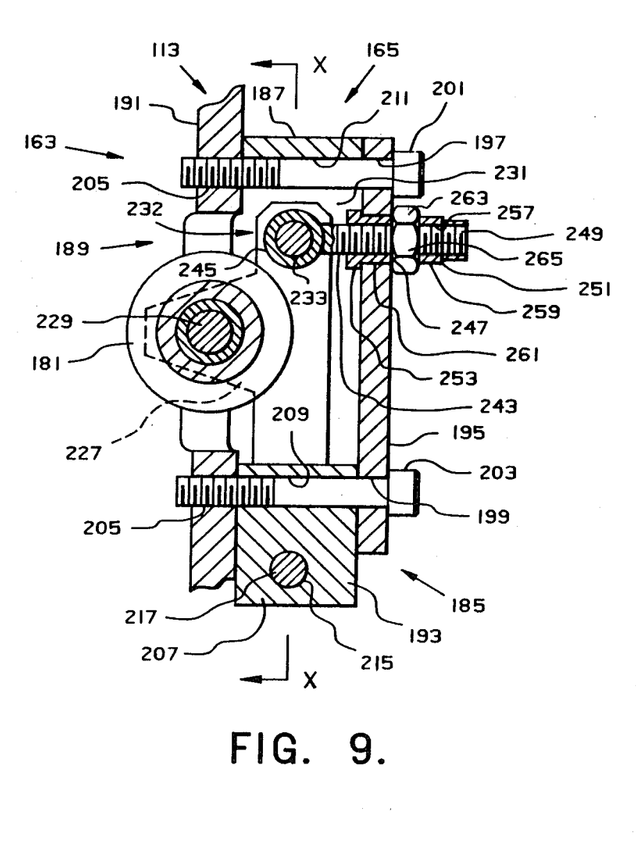
FIG. 9 is a view taken along lines IX—IX of FIG. 8.
Figure 10:
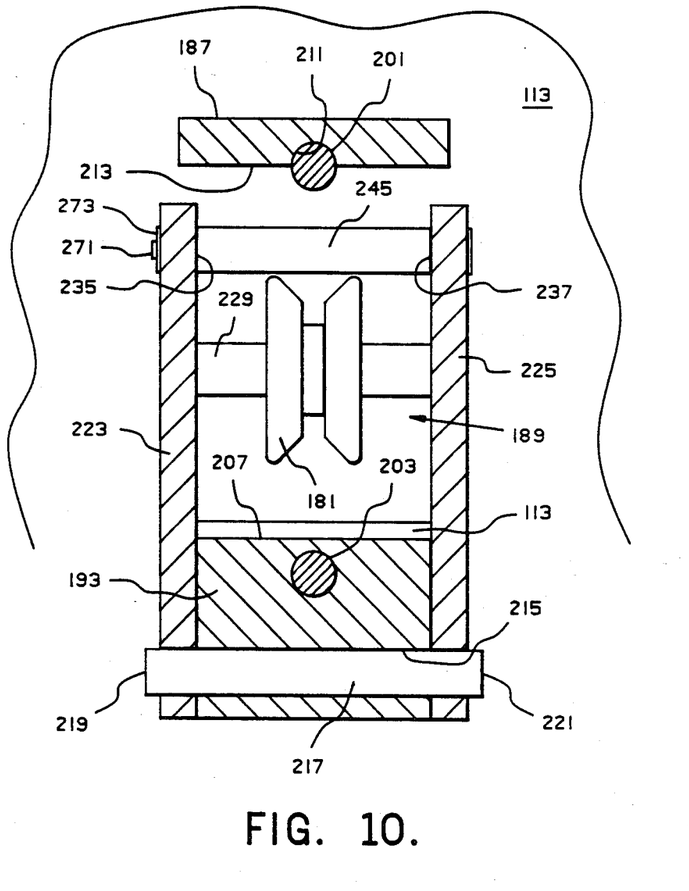
FIG. 10 is a view taken along lines X—X of FIG. 9.

A bore 215 is formed through the block 207 transverse to aperture 209 and a pivot pin 217 is positioned in the bore 215. The pivot pin has opposite ends 219 and 221 to which upwardly extending side bars 223 and 225 respectively are secured. The side bars 223 and 225 each carry an inwardly directed arm 227 between which a shaft 229 extends, with the roller 181 mounted on the shaft 229 between the arms 227. Adjacent the upper end 231 of the side bars and extending between the upper ends of the side bars 223 and 225 is an alignment means 232 such as an alignment beam 233 which is fixed at opposite ends 235 and 237 to the side bars 223 and 225. The side bars 223 and 225, being secured to the pivot pin 217 are movable towards and away from the inner mast 111, such that the roller 181 on the shaft 229 extending between arms 227 of the side bars are also movable towards and away from the inner mast 111. Precise alignment of the position of the rollers 181 is effected by use of an adjustable device 241 which contacts the alignment beam 233. Adjustable device 241, as illustrated, is in the form of a threaded shaft 243 which is movable towards or away from alignment beam 233 and can be locked in various positions relative to the same, the threaded shaft secured, such as by welding, to a sleeve 245 that encloses the alignment beam 233, but is adapted to permit rotational movement of the alignment beam relative to the sleeve. The threaded shaft 243 extends from the sleeve 245 outwardly through an opening 247 in the plate 195 and has threads 249 thereon. A hollow stud 251 having a shoulder 253, engageably with the inner wall of plate 195, has threads 255 on the internal wall 257 thereof and threads 259 on the external wall 261 thereof. The threads 255 on the internal wall 257 are engageable with the threads 249 on the threaded shaft 243. A lock nut 263 having threads 265, is threadedly engageable with the threads 259 on the external wall 261 of the hollow stud on the opposite side of the plate 195 from threaded shoulder 253.

In operation of the adjustable device to move the roller 181 on shaft 229 inwardly towards the inner mast 111, the lock nut 263 is loosened and the threaded shaft 243 and hollow stud are moved inwardly which moves sleeve 245 and alignment beam 233. Side bars 223 and 225 secured to the alignment beam 233 also move inwardly, pivoting on pivot pin 217. When the desired placement is achieved, the hollow stud 251 is threaded along threaded shaft 243 until shoulder 253 abuts the inside surface 267 of plate 195. The threaded lock nut 263 is then threaded along the hollow stud 251 until the nut abuts the outside surface 269 of the plate 195 to lock the shaft 243, alignment beam 233, and the roller 181 in position.

An alignment pin or knob 271 extends from an end 273 of alignment beam 233, which provides an external reference surface. The surface or pin facilitates field alignment of all elevations of guide rollers by using a plumb line or an optical sighting device to align the pins vertically. By so aligning the pins 271, the vertically spaced plurality of rollers 181 are aligned along a common vertical axis for easy field alignment of all of the rollers.

The present guide means can be provided on new refueling machines or can be used as an alteration to existing refueling machines as a retrofit system.

What is claimed is:

1. An apparatus for loading or unloading a fuel assembly in a nuclear reactor comprising:

means for positioning a fuel assembly above the reactor;
a housing on said positioning means;
a pair of concentric inner and outer masts carried by said housing;
said inner mast having means thereon for gripping a fuel assembly;
means for vertically axially moving said inner mast relative to said outer mast; and
guide means on said inner and outer masts to align the inner mast centrally within the outer mast during vertical axially moving the inner mast relative to the outer mast, said guide means including a plurality of inner members disposed on the inner mast and complementary shaped outer members vertically spaced on the outer mast which cooperate with said inner members, means for supporting said outer members on said outer mast, means for pivoting said outer members relative to said support means towards and away from said inner members, and means for vertically aligning the position of said outer member.

2. The apparatus for loading or unloading a fuel assembly in a nuclear reactor as defined in claim 1 wherein said outer members on said outer mast comprise rollers.

3. The apparatus for loading or unloading a fuel assembly in a nuclear reactor as defined in claim 2 wherein said rollers have a concave groove therein and said inner members have a convex surface thereon cooperating with said groove.

4. The apparatus for loading or unloading a fuel assembly in a nuclear reactor as defined in claim 1 wherein said means for supporting said outer members on said outer mast comprises a framework about an opening in the wall of the outer mast and said outer members are rollers disposed on a shaft, and said shaft extends between two spaced side bars mounted for pivoted movement relative to said framework.

5. The apparatus for loading or unloading a fuel assembly in a nuclear reactor as defined in claim 4 wherein said framework comprises a top wall above said opening, a bottom wall below said opening and a plate extending between said top and bottom walls, said bottom wall comprises a block with a bore therethrough, and said side bars are secured to a pivot pin disposed in said bore for said pivotal movement.

6. The apparatus for loading or unloading a fuel assembly in a nuclear reactor as defined in claim 5 wherein said framework includes an aperture through said bottom wall and a cooperating aperture through said plate, with a bolt passing therethrough and threadedly engaged in the wall of the outer mast, and a groove is provided in the lower face of said top wall and a cooperating aperture through said plate, with a bolt passing therethrough threadedly engaged in the wall of the outer mast.

7. The apparatus for loading or unloading a fuel assembly in a nuclear reactor as defined in claim 4 wherein said alignment means comprises an alignment beam adjacent to and extending between the upper ends of the side bars, an alignment pin extending from one end of the alignment beam for vertically aligning the position of said rollers, and an adjustable device which contacts the alignment beam.

8. The apparatus for loading or unloading a fuel assembly in a nuclear reactor as defined in claim 7 wherein said adjustable device comprises a sleeve enclosing said alignment beam, a threaded shaft co-acting with said sleeve and extending from said sleeve outwardly through an opening in said plate, a hollow stud having threads on the internal and external wall thereof about said threaded shaft in the opening of said plate, having a shoulder thereon, for abutting the inside of said plate and a lock nut engageable with the threads of said threaded shaft, for abutting the outside of said plate.

9. A guide means for use in centrally aligning inner and outer masts of an apparatus including means for vertically axially moving said inner mast relative to said outer mast, said guide means comprising:

a plurality of inner members disposed on the inner mast;

a plurality of complementary shaped outer members vertically spaced on the outer mast which cooperate with said inner members;

means for supporting said outer members on said outer mast;

means for pivoting said outer members relative to said support means towards and away from said inner members; and means for precisely vertically aligning the position of said outer members.

10. The guide means as defined in claim 9 wherein said means for supporting said outer members on said outer mast comprises a framework about an opening in the wall of the outer mast and said outer members are rollers disposed on a shaft, and said shaft extends between two spaced side bars mounted for pivoted movement relative to said framework.

11. The guide means as defined in claim 10 wherein said framework comprises a top wall above said opening, a bottom wall below said opening and a plate extending between said top and bottom walls, said bottom wall comprises a block with a bore therethrough, and said side bars are secured to a pivot pin disposed in said bore for said pivotal movement.

12. The guide means as defined in claim 11 wherein said framework includes an aperture through said bottom wall and a cooperating aperture through said plate, with a bolt passing therethrough and threadedly engaged in the wall of the outer mast, and a groove is provided in the lower face of said top wall and a cooperating aperture through said plate, with a bolt passing therethrough threadedly engaged in the wall of the outer mast.

13. The guide means as defined in claim 11 wherein said alignment means comprises an alignment beam adjacent to and extending between the upper ends of the side bars, an alignment pin extending from one end of the alignment beam for vertically aligning the position of said rollers, and an adjustable device which contacts the alignment beam.

14. The guide means as defined in claim 13 wherein said adjustable device comprises a sleeve enclosing said alignment beam, a threaded shaft co-acting with said sleeve and extending from said sleeve outwardly through an opening in said plate, a hollow stud having threads on the internal and external wall thereof about said threaded shaft in the opening of said plate, having a shoulder thereon, for abutting the inside of said plate and a lock nut engageable with the threads of said threaded shaft, for abutting the outside of said plate.

* * * * *